United States Patent

Davies et al.

[11] Patent Number: 5,843,565
[45] Date of Patent: Dec. 1, 1998

[54] PARTICULATE MAGNETIC MEDIUM UTILIZING KEEPER TECHNOLOGY AND METHODS OF MANUFACTURE

[75] Inventors: David H. Davies, Cupertino; Thomas M. Coughlin, Atusedoro; Beverley R. Gooch, Sunnyvale, all of Calif.

[73] Assignee: Ampex Corporation, Redwood City, Calif.

[21] Appl. No.: 742,135

[22] Filed: Oct. 31, 1996

[51] Int. Cl.$^6$ .................................. G11B 5/66; B32B 7/02
[52] U.S. Cl. ........................ 428/212; 428/213; 428/336; 428/403; 428/611; 428/692; 428/694 B; 428/694 BS; 428/694 BA; 428/694 BM; 428/900; 427/130; 427/131; 360/110; 360/125
[58] Field of Search ..................... 428/336, 212, 428/213, 611, 403, 692, 694 B, 694 BS, 694 BA, 900, 694 BM; 427/130, 131; 360/110, 125

[56] References Cited

U.S. PATENT DOCUMENTS

| | | | |
|---|---|---|---|
| 3,079,468 | 2/1963 | Morey | 360/119 |
| 3,084,227 | 4/1963 | Peters | 360/115 |
| 3,106,614 | 10/1963 | Fox | 379/120 |
| 3,127,592 | 3/1964 | Neergaard | 360/112 |
| 3,188,399 | 6/1965 | Eldridge | 360/126 |
| 3,239,823 | 3/1966 | Chang | 360/111 |
| 3,255,307 | 6/1966 | Schuller | 360/84 |
| 3,314,056 | 4/1967 | Lawrance | 360/119 |
| 3,319,254 | 5/1967 | Honig | 346/37 |
| 3,432,837 | 3/1969 | Fan | 360/119 |
| 3,435,440 | 3/1969 | Nallin | 360/115 |
| 3,555,204 | 1/1971 | Braun | 360/115 |
| 4,277,809 | 7/1981 | Fisher et al. | 360/131 |
| 4,318,136 | 3/1982 | Jeffers | 360/17 |
| 4,410,603 | 10/1983 | Yamamori et al. | 428/611 |
| 4,464,691 | 8/1984 | Sawazaki | 360/111 |
| 4,530,016 | 7/1985 | Sawazaki | 360/55 |
| 4,535,369 | 8/1985 | Sawazaki | 360/55 |

(List continued on next page.)

FOREIGN PATENT DOCUMENTS

| | | |
|---|---|---|
| 488433 | 1/1976 | Australia . |
| 71361/74 | 1/1976 | Australia . |
| 04721612A | 2/1992 | European Pat. Off. . |
| 3509020 | 9/1985 | Germany . |
| 53-65715 | 4/1978 | Japan . |
| 818811 | 8/1959 | United Kingdom . |
| 822240 | 10/1959 | United Kingdom . |
| 844081 | 8/1960 | United Kingdom . |
| 2073472 | 10/1981 | United Kingdom . |
| WO87/03728 | 6/1987 | WIPO . |

OTHER PUBLICATIONS

IEEE Transactions on Magnetics, "A Yoke Magnetoresistive Head for High Track Density Recording", Maruyama et al., vol. Mag–23, No. 5, Sep. 1987, pp. 2503–2505.

(List continued on next page.)

Primary Examiner—Leszek Kiliman
Attorney, Agent, or Firm—George B. Almeida; John G. Mesaros; Cesari & McKenna

[57] ABSTRACT

The flexible, particulate magnetic storage medium includes a substrate and a magnetic storage layer of hard magnetic particles held within a binder. The flexible, particulate magnetic storage medium also includes a soft magnetic keeper layer. The soft magnetic keeper layer may be established by coating the individual hard magnetic particles of the magnetic storage layer with a layer of soft magnetic material to establish a "keeper layer" around each particle. A break layer of non-magnetic material may be provided between the hard and soft layers. The individual particles are coated by methods such as in situ precipitation. The soft magnetic layer may also be established by providing a separate layer of soft magnetic material within a binder of cross linkable resins. The resulting flexible, particulate magnetic storage medium is a laminate principally comprising a substrate, a first layer of hard magnetic particles within a binder, and a second layer of soft magnetic particles also within a binder. The laminate medium may be produced through extrusion of binder particle mixes through multi aperture slot die extensions. The flexible, particulate magnetic media may be used in tape or flexible disc formats.

14 Claims, 10 Drawing Sheets

U.S. PATENT DOCUMENTS

| | | |
|---|---|---|
| 4,613,915 | 9/1986 | Crouse et al. .................. 360/77.02 |
| 4,642,709 | 2/1987 | Vinal ................................ 360/77.05 |
| 4,657,812 | 4/1987 | Hatanai et al. .................... 428/328 |
| 4,657,819 | 4/1987 | Funaki ................................ 428/458 |
| 4,687,712 | 8/1987 | Sugita et al. ...................... 428/611 |
| 4,698,711 | 10/1987 | Vinal ................................. 360/113 |
| 4,717,592 | 1/1988 | Nagao et al. ...................... 427/128 |
| 4,782,415 | 11/1988 | Vinal ................................. 360/113 |
| 4,985,795 | 1/1991 | Gooch ................................ 360/115 |
| 5,041,922 | 8/1991 | Wood .................................. 360/55 |
| 5,062,007 | 10/1991 | Nakatsu et al. ..................... 360/29 |
| 5,105,323 | 4/1992 | Ruigrok .............................. 360/122 |
| 5,119,255 | 6/1992 | Gooch ................................ 360/115 |
| 5,130,876 | 7/1992 | Gooch ................................ 360/115 |
| 5,132,957 | 7/1992 | Mashimo ............................. 369/59 |
| 5,147,732 | 9/1992 | Shiroishi et al. .................. 428/668 |
| 5,153,796 | 10/1992 | Gooch ................................ 360/115 |
| 5,176,965 | 1/1993 | Mallary .............................. 428/694 |
| 5,189,572 | 2/1993 | Gooch ............................. 360/77.12 |
| 5,216,657 | 6/1993 | Nishiuchi et al. ................... 369/60 |
| 5,227,939 | 7/1993 | Gooch ................................ 360/115 |
| 5,243,588 | 9/1993 | Maeda et al. ........................ 369/54 |
| 5,331,492 | 7/1994 | Komai et al. ....................... 360/113 |
| 5,337,203 | 8/1994 | Kitada et al. ....................... 360/113 |
| 5,431,969 | 7/1995 | Mallary .............................. 427/599 |
| 5,483,403 | 1/1996 | Voegeli .............................. 360/113 |
| 5,493,464 | 2/1996 | Koshikawa ........................... 360/113 |
| 5,514,452 | 5/1996 | Araki et al. ........................ 428/213 |

OTHER PUBLICATIONS

IEEE Transactions on Magnetics, "Effect of Induced Uniaxial Magnetic Anisotropy of Ni–Fe Keeper Layer on the Recording Properties of Longitudinal Co–Cr–Ta/Cr Thin Film Media", Sin et al., vol. 31, No. 6, Nov. 1995.

IEEE Transactions on Magnetics, "A High Resolution Flying Magnetic Disk Recording System with Zero Reproduce Spacing Loss", Gooch et al., vol. 27, No. 6, Nov. 1991, pp. 4549–4554.

IEEE Transactions on Magnetics, "New Concepts for Perpendicular Magnetic Recording Hard Disk System", Nakamura et al., vol. 27, No. 6, Nov. 1991, pp. 4555–4560.

Shun–ichi Iwasaki, Yoshihisa Nakamura and Isao Watanabe, "Perpdendicular Recording/Playback on Composite Film Media" No. 37, Research Institute, Electro–communication, Tohoku University, Memo for the 1979 Electro–communication Society (Semiconductor and Material Department) Meeting No. 191.

Shun–ichi Iwasaki, Kazuhiro Ohuchi and Naoki Honda, "Anisotropy and Film Structure of Perpendicular Recording Medium" No. 38, Research Institute, Electro–communication, Tohoku University, Memo for the 1979 Electro–communication Society (Semiconductor and Material Department) Meeting No. S2–5.

Shun–ichi Iwasaki and Yoshihisa Nakamura, One Method for Magnetic Recording Using Composite Recording Medium, No. 46, Memo for the 1979 Electro–communication Society Meeting No. 241.

Shun–ichi Iwasaki, Yoshihisa Nakamura and Masaki Watanabe, "Relationship between Recording Sensitivity and Reproducing Sensitivity in Perpendicular Recording" No. 48, Memo for the 1979 Tohoku–area Electronic Related Society Meeting No. 1F2.

Shun–ichi Iwasaki, Kazuhiro Ohuchi and Naoki Honda, Magnetic Behaviors of Composite Film Medium in Perpendicular Recording No. 39, Research Institute, Electro–communication, Tohoku University, Abstracts of the 3rd Annual Conference on Magnetics in Japan, 1979 (24pA–6).

Shun–ichi Iwasaki, Yoshihisa Nakamura, Isao Watanabe and Masaki Watanabe, "High Density Recording and Reproducing with Perpendicular Magnetic Head", No. 40, Research Institute, Electro–communication, Tohoku University, Abstract of the 3rd Annual Conference on Magnetics in Japan, 1979 (24pA–14).

Shun–ichi Iwasaki, Yoshihisa Nakamura and Makoto Koizumi, Experiments of Perpendicular Magnetic Recording with Magnified Head and Medium, No. 41, Research Institute, electro–communication, Tohoku University, Abstract of the 3rd Annual Conference on Magnetics in Japan, 1979, (24pA–13).

Marvin Camras, Magnetic Recording Handbook, 1988.

James E. Opfer, Bruce F. Spenner, Bangalore R. Natarajan, Richard A. Baugh, Edward S. Murdock, Charles C. Morehouse and David J. Bromley, Thin–Film Memory Disc Development, 1985, pp. 4–10.

Eberhard Koste, Fernseh–Und Kino–Technik, 1984, pp. 425–432.

W. Earl Stewart, Magnetic Recording Techniques, 1958, pp. 87–104.

J. Flora and J.R. Werning, Multitrack Probe Type Recording Transducer, IBM Technical Disclosure Bulletin.

Otto Kornei, Survey of Flux–Responsive Magnetic Reproducing Heads, Journal of Audio Engineering Society, vol. 2, No. 3, Jul. 1954.

Dirk Quak, Influence of the Layer of Thickness of a Double–Layer Medium on the Reproduced Signal in Perpendicular Recording, IEEE Transactions On Magnetics, vol. Mag–19, No. 4, Jul. 1983.

Shun–ichi Iwasaki, Perpendicular Magnetic Recording, IEEE Transactions On Magnetics, vol. Mag–16, No. 1, Jan. 1980.

PARTICULATE MAGNETIC MEDIUM UTILIZING KEEPER TECHNOLOGY AND METHODS OF MANUFACTURE

CROSS REFERENCE TO RELATED APPLICATIONS

This application contains subject matter related to the following commonly assigned, co-pending U.S. patent application: Ser. No. 08/674,768 filed Jun. 28, 1996, now pending designated attorney docket number 112008-23/AMP-3860, entitled "Magnetic Storage and Reproducing System With a Low Permeability Keeper and a Self-Biased Magnetoresistive Reproduce Head".

TECHNICAL FIELD

The present invention relates to magnetic recording and reproducing systems, and in particular to a magnetic tape recording and reproducing system having a keepered particulate magnetic storage medium.

BACKGROUND OF THE INVENTION

In conventional wideband, high density magnetic signal processing, magnetic flux transferred to or from a flexible particulate magnetic tape storage medium permeates a magnetic core of a magnetic transducer (i.e., a head). During reproduction operation modes this flux produces an induced output voltage which, after suitable amplification, is a reproduced representation of the magnetic flux from the media that permeates the core and is suitable for use by a utilization device. During record operation modes, the permeating flux results from current applied to the transducer coil winding, and the flux fringes from a physical gap provided in the core for recording a representative signal in the magnetic storage medium.

One problem with prior art magnetic tape and flexible disc storage systems is that various losses occur during signal transfers between the flexible storage medium and the transducer. One of the more significant losses, called "spacing loss", results from the physical spacing between the flexible medium and the transducer. Spacing loss is particularly deleterious during reproduction operations where the effects of such loss are more significant. Prior efforts to reduce spacing loss primarily involved reducing the physical spacing by placing the transducer as close to the magnetic storage medium surface as operating conditions permitted. Such positioning, however, is accompanied by an increase in the likelihood of collisions between the transducer and the medium, particularly in devices in which the transducer is normally supported above and out of contact with the storage medium surface, i.e., the transducer "flies" relative to the storage medium. On the other hand, if the transducer is in physical contact with the medium, damaging wear occurs due to the contact. However, it should be noted that if contact heads are used, the head is still separated from the particulates of the storage medium by several factors. Along with the physical space between the head and the medium, there are several material phenomenon which contribute to an effective spacing which is larger than the physical spacing. Several of those phenomenon shall now be discussed.

During fabrication the tape or flexible disc medium is converted from a "green" state to a more fully cured and calendered form which is smoother and more durable in terms of head to tape wear. As known, the calendering process involves the compaction of the particle matrix in the cross linked binder. This compaction is performed at high temperature and pressure, and results in a resin surface where the magnetic particles are somewhat buried under the surface. In essence this creates a non-magnetic layer between the head gap and the medium. Measurements have shown this layer to be as much as 1–2 micro inches in thickness depending on the magnetic medium chemical formulation, calendering conditions, etc.

A second material phenomenon which undesirably increases the effective spacing is the microscopically rough, non-planar surface of the flexible particulate magnetic medium. This roughness originates from the particulate nature of the film, the difficulty in dispersion of the particles in the binder and the asperities derived from the base film. The transducer will therefore tend to ride on the tops of the asperities and this in effect creates an additional separation of, on average, one (1) microinch.

A third material phenomenon is the friction build up at high temperatures that result as the flexible medium and head pass each other at the relative high speeds associated with modern storage systems. If head wear is minimal, then over time the degradation products of the particulate binder of the medium, and the head materials, will bond into a resilient film referred to as a "headfilm". This film is often thought to reach 0.5 microinches and is known to cause poor read/write performance typical of increased spacing loss.

Another factor which contributes to the effective spacing is the use of lubricants. As known, lubricants are added to such magnetic medium formulations to minimize friction build up. However, the lubricants cause additional spacing loss due to the fact that further separation occurs as the medium ages and lubricant migrates out of the particle matrix. This adds about another 0.1 micro inch to the spacing.

Yet another factor is that since the hard magnetic particles are acicular in shape and made of iron, they are pyrophoric, and therefore, are coated with a very thin layer of inert ceramic material. This, of course, effectively further separates the magnetic layer from the transducer.

These separate factors combine to establish an effective spacing between the magnetic particles and the transducer that is larger than the actual spacing between the transducer and the top surface of the medium.

A problem with the large effective spacing between the head and the medium is decreased output signal strength and increased intersymbol interference.

SUMMARY OF THE INVENTION

Accordingly, it is an object of the present invention to provide a flexible, particulate magnetic storage and reproducing system with an improved storage density through improved system signal-to-noise ratio and reduced intersymbol interference.

According to the present invention, a magnetic storage system comprises a read/write transducer and a flexible, particulate magnetic storage medium. The particulate storage medium includes a flexible substrate and a magnetic storage layer of hard magnetic particles within a binder. The magnetic storage medium also includes a soft magnetic keeper layer. The particulate magnetic storage medium can be either a magnetic tape or a flexible disc.

The soft magnetic keeper layer is established by coating the individual hard magnetic particles of the magnetic storage layer with a layer of soft magnetic material to establish a "keeper layer" around each particle. The coating of soft magnetic material is applied so the thickness of the keeper layer is sufficient to establish a permeability which is preferably greater than about two (2), where the permeability of air is one. A separation layer of non-magnetic material may be provided between the hard and soft layers.

A preferred method for conformally coating each hard magnetic particle with a soft layer is in situ precipitation. Other suitable techniques for providing the soft layer coating include spray coating the hard magnetic particles directly and plasma deposition methods.

The soft magnetic keeper layer may also be established by providing a separate layer of soft magnetic material in particle form within a binder of cross linkable resins. The resulting flexible particulate magnetic storage medium is a laminate principally comprising a substrate, a first layer of hard magnetic particles within a binder, and a second layer of soft magnetic particles also within a binder. This soft magnetic keeper layer may be positioned above or below the magnetic storage layer.

The keeper layer preferably has a relatively low permeability (e.g., less than 1000). When operating in an unsaturated state, the relatively soft magnetic material of the keeper layer acts as a shunt path for flux emanating from recorded transitions on the magnetic storage layer, thereby producing an image field of the recorded transitions in the relatively soft magnetic material which has the effect of reducing the demagnetization, and thus reducing the recorded transition length. This shunt path substantially reduces the flux levels emanating from the recorded transitions and reaching a transducer head of the system. The shunt path also increases the stability of the recorded transitions with respect to thermal demagnetization.

To read data from a recorded transition on the magnetic storage layer, a saturating bias current is applied to windings of the head, creating a bias flux of sufficient strength and direction so as to saturate a portion of the soft magnetic material proximate that transition. While saturated or driven close to saturation, this portion of the soft magnetic material can no longer shunt flux emanating from the recorded transition. This allows substantially all of the flux from the recorded transition to couple to the head.

Data representative of those recorded transitions can only be reproduced when the bias flux is applied to saturate the associated portions of the keeper layer and, thereby, terminate the shunt. The shunting of flux by the keeper also reduces the side fringing fields which facilitates obtaining higher track density in the recording system.

The keeper layer acts to mitigate the negative effects of the head to tape separation described above. In effect, with the keeper layer, the head and the medium are in much closer magnetic contact than they are in physical contact. This is the result of the imaging effects of the keeper layer, and the concentrating effect of the keeper aperture that channels flux from the transition being read, thus making it a closer approximation to the flux from a true contact head. In addition the shielding effect of the keeper prevents adjacent transitions from being read by the head in the same way that a closer head would accomplish.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
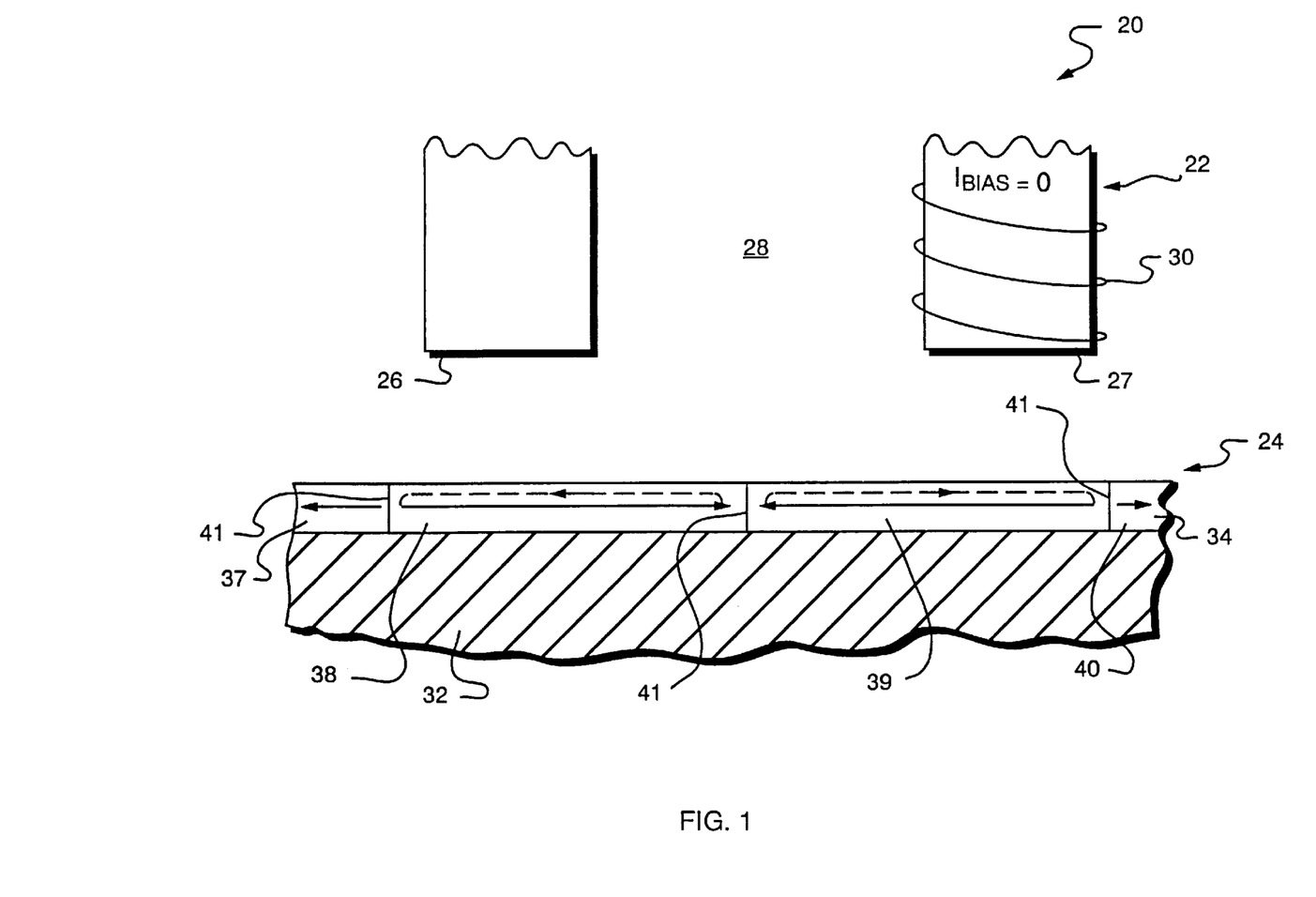
FIG. 1 is a schematic cross sectional illustration of a flexible, particulate magnetic storage and reproducing system in accordance with the present invention.

Referring now to FIG. 1, a flexible, particulate magnetic storage and reproducing system 20 is illustrated comprising a magnetic transducer 22 which writes data to and reads data from a flexible particulate storage medium 24 (which can be in a tape or flexible disc format). The transducer 22 comprises poles 26, 27 which form a gap 28, and wherein an electrically conductive winding 30 is disposed about one of the poles. Although the transducer 22 is shown for ease of illustration as a thin film head, one of ordinary skill will appreciate that other head designs such as ferrite, or a magnetoresistive (MR) head may also be used.

The flexible, particulate magnetic storage medium 24 includes a flexible substrate 32 and a magnetic storage layer 34. The substrate 32 is a non-magnetic material such as polyethylene terephthalate (PET). The magnetic storage layer 34 is segmented into a plurality of record regions 37–40 which define record transitions 41 at their abutting boundaries. Either digital or analog signals may be recorded in the magnetic storage medium in a variety of conventional manners known in the art. In the illustrative embodiment, digital signals are preferably recorded in the magnetic storage layer in longitudinal fashion, wherein, each record region 37–40 is suitable for storing encoded bits of data.

Figure 2:
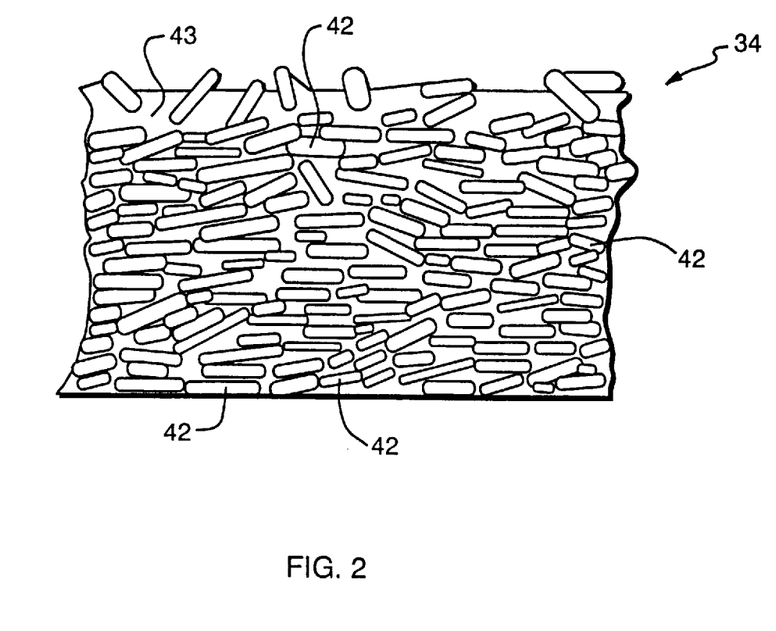
FIG. 2 is a cross sectional illustration of the magnetic storage layer and the plurality of coated magnetic particles therein.

Referring to FIG. 2, the storage layer 34 includes a plurality of fine acicular shaped particles 42 of a high coercivity, hard magnetic material, such as iron within a resin binder 43. The binder 43 should disperse the particles 42 and provide adhesive bonding to the substrate 32. The layer 34 is preferably chosen to have a longitudinal anisotropy which provides record magnetization which is predominantly longitudinal (i.e., horizontal) to the paper as oriented in FIG. 1. As shown in FIG. 1, the magnetization polarity of each record region 37–40 is represented by horizontal solid arrows, wherein the arrow direction is indicative of the polarity of the magnetization in each region. Referring again to FIG. 2, according to an aspect of the present invention, each of the magnetic particles 42 in the magnetic storage layer 34 is coated with a layer of soft magnetic material.

Figure 3:
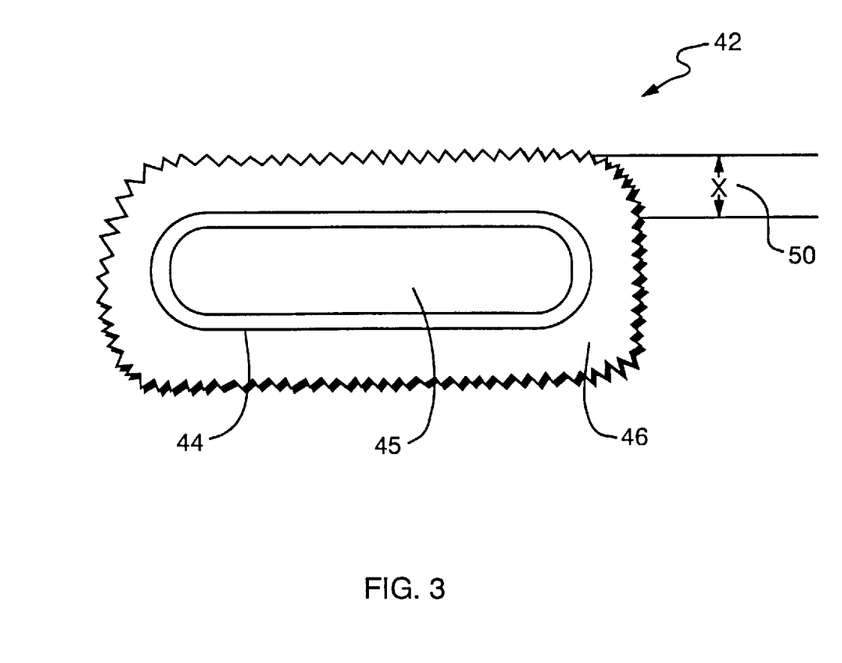
FIG. 3 is a cross sectional illustration of one of the plurality of coated magnetic particles illustrated in FIG. 2.

FIG. 3 is a cross sectional illustration of an individual hard magnetic particle 42 comprising a fine acicular shaped iron particle 45 coated with a thin layer of non-magnetic decoupling material (e.g., oxide or ceramic) to establish a magnetic break layer 44. The particle 42 also includes a layer of soft magnetic material 46, which is referred to hereinafter as a "keeper layer". The soft magnetic material of the keeper layer 46 has preferably a relatively low permeability, which in combination with adjacent keepers, images each of the individual magnetic transitions 41 (FIG. 1) and can be saturated by a small bias flux. However, the soft magnetic material does not saturate when the flux from the particles is the only flux acting on the keeper layer (i.e., when the bias flux is not applied). Suitable keeper layer materials include permalloy, sendust, super sendust, alloys of iron with nitrogen, and alloys of sendust with nickel.

Figure 4:
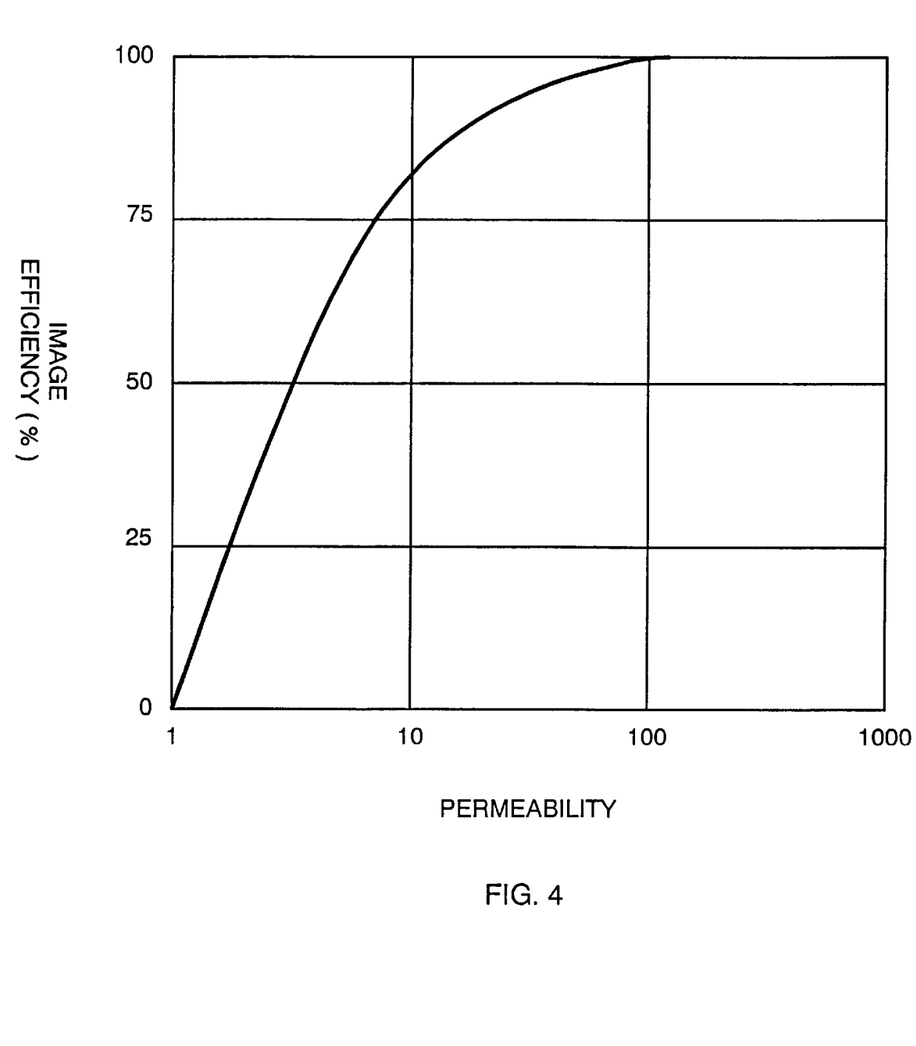
FIG. 4 is a plot of image efficiency versus permeability.

The characteristics of the keeper layer 46 are selected to ensure that in the absence of a bias flux from the winding 30 (FIG. 1), the layer 46 shunts flux from the record regions 37–40 to create a magnetic image in the keeper. FIG. 1 illustrates the case where the bias current $I_{bias}$ through the winding 30 is zero. In this situation, the keeper operates as a shunt, establishing a inverse image of the magnetization in the record regions. For example, each keepered coating within record region 38 conducts flux (shown as a dotted line) which forms an inverse image of the remnant magnetization associated with the hard magnetic particles 42 within the recorded region 38. The quality of the image (and therefore the effectiveness of the shunt) can be characterized by an image efficiency which is graphically illustrated in FIG. 4 as a function of the keeper layer permeability. The image efficiency is about 75% for a permeability of approximately seven (where permeability of air is one), and it approaches 100% for permeabilities above one-hundred. The image efficiency indicates the effectiveness of the keeper layer as a shunt. As the image efficiency approaches 100%, the more effective the keeper layer is as a shunt, and therefore, fewer fringing fields emanate from the magnetic storage medium 24. "Low permeability" includes permeabilities of less than about 1000, and preferably the permeability of the keeper layer is less than about 100 in unsaturated portions of the keeper.

Referring again to FIG. 3, the keeper layer has a thickness X (50) which is sufficient to achieve adequate magnetic permeability, which is preferably greater than two (2) relative to a standard of air at 1. The typical keeper layer thickness X is preferably greater than about 75 Angstroms, and a practical upper limit on the thickness is set by the desire to limit the dilution of the hard magnetic packing layer which reduces the total magnetization moment. Such a limit may be about 200 Angstroms.

The magnetic break layer 44 decouples the hard magnetic particle 45 and the keeper layer 46. The break layer 44 should be greater than about 5 Angstroms in order to provide adequate decoupling, and is preferably less than about 50 Angstroms to avoid transmission losses in the imaging of the magnetic components. Suitable materials for the break layer 44 include carbon and oxides such as aluminum oxide, chromium oxide and ceramic oxides. It should be noted that the fine acicular iron particles 45 used for advanced high density recording are often already coated with an outer layer to provide oxidation protection, and this layer may also satisfy the criteria for a suitable break layer.

The coated particles of the flexible, particulate storage medium according to the present invention may be produced using the method of in situ precipitation using an "oxine" reagent such as 8-hydroxyquinoline. The "oxine" reagent may be prepared by dissolving two grams of oxine in 100 ml. of 2N-acetic acid and then adding ammonia solution dropwise until a turbidity begins to form. The resultant solution is then clarified by adding a small amount of acetic acid. This solution is stable for long periods, particularly if it is stored in an amber bottle. An alternative method of preparing the "oxine" reagent is to dissolve two grams of oxine in 1200 ml. of methyl or ethyl alcohol (note, this reagent cannot be used for the precipitation of aluminum to be discussed below) or in acetone. This alternative method produces a reagent which is stable for approximately ten days if protected from light.

To perform the precipitation method, the soft layer metal mixture is dissolved in an appropriate solute, dilute acid such as hydrochloric is one choice, in appropriate alloy ratios such as 6 wt % Si, 4 wt % Al, 3 wt % Ni and 87 wt % Fe. Next, the oxide coated magnetic particles are added to the mixture and dispersed uniformly therein. The dispersion should be maintained as a uniform suspension within the mixture, by for example agitation or an equivalent. An appropriate organic complexing agent such as "oxine" or alternatively 4-methylnioxime, or any other agent that forms an organometallic complex with the metal is then added. The next step is to precipitate the organometallic complex, preferably by changing the pH of the mixture, and then drying the resulting complex mixture and heating it in an inert atmosphere to decompose the organometallic complex back into the metal. The coated magnetic pigment is then redispersed and applied to the flexible substrate as "magnetic paint".

This method results in a coating that has precipitated preferentially on the magnetic particle surface and hence is in intimate contact with the magnetic particle. It should be noted that microdispersed particles of the soft magnetic material may be interspersed around and between the coated particles 42.

In a preferred method, nickel, aluminum and iron may be dissolved separately, each in the presence of hard magnetic material, and then combined in selected ratios to create the desired alloy composition. Specifically, to precipitate iron, 25 ml. of a ferric solution (containing about 0.03 g. of Fe) is treated with a dilute ammonia solution until a faint precipitate persists, and the precipitate is then dissolved in a minimum volume of N-hydrochloric acid. A solution of 3 g. of ammonium acetate in 125 ml. of water is then added, followed by oxine solution (2% in N-acetic acid) with a constant stirring until an excess is present, 12–15 ml. is required. The precipitate is then digested at 80°–90° C. for 90 minutes, filtered, washed with water, and dried to a constant weight at 130°–140° C.

To precipitate aluminum, 25–50 mg. of aluminum is added to 1–2 ml. of concentrated hydrochloric in a volume of 150–200 ml. Then 0.45 g. of ammonium aluminum sulfate is dissolved in water which contains about 1.0 ml. of concentrate hydrochloric acid. The solution is then diluted to about 200 ml. Next, 5–6 ml. of oxine reagent (a 10% solution in 20% acetic acid) and 5 g. of urea are added to the solution, and the breaker containing the solution is covered and heated at 90° C. for approximately 90 minutes. The precipitation process is complete when the supernatant liquid originally a greenish yellow becomes a pale orange yellow color. After cooling, the precipitate is collected, washed with water, and then dried at 130°–140° C.

To precipitate nickel, a solution of nickelous salt (150 ml. with up to 0.1 g. of Ni) containing 3–5 g. of sodium acetate and 8–10% of acetic acid, is warmed to 70° C., treated with an excess 2% alcoholic oxine solution, and then boiled until the precipitate of $Ni(C_9H_6ON)_2$ becomes granular. Next the precipitate is collected, thoroughly washed with water and dried at 130°–140° C.

The keeper layer 46 can also be used as a protective coating by selection of the appropriate material (e.g., Supersendust, 6 wt % Si, 4 wt % Al, 3 wt % Ni and 87 wt % Fe.) As set forth above, the associated method used to make this kind of coating is in situ precipitation of the soft magnetic material using the conventional magnetic particle surface as the nucleation site.

It is contemplated that an alternative coating method may include precipitation of metal carbonates. This can be achieved for several metals including cobalt, through for example, the addition of a soluble carbonate such as sodium carbonate to a solution of metal salt. The resulting metal carbonate is then heated in an appropriate atmosphere to chemically reduce the coating to the metal. Other alternative coating techniques include spray coating the particles directly and plasma spray deposition. In general, a number of coating techniques may be employed to coat the particle with the keeper layer, and in general these techniques have the following characteristics: (1) the soft layer materials should be in solution, and the solute should be non-interactive with the particles of the hard magnetic material, i.e., that they are undissolved, not chemically reactive and do not become agglomerated by the solvent; (2) the precipitation reaction should be such that the soft magnetic material forms selectively on the hard magnetic particle surface, although it need not be exclusively on the surface; and (3) the precipitate should be such that the metal components can be regenerated without degradation and with a reasonable degree of purity.

Figure 5:
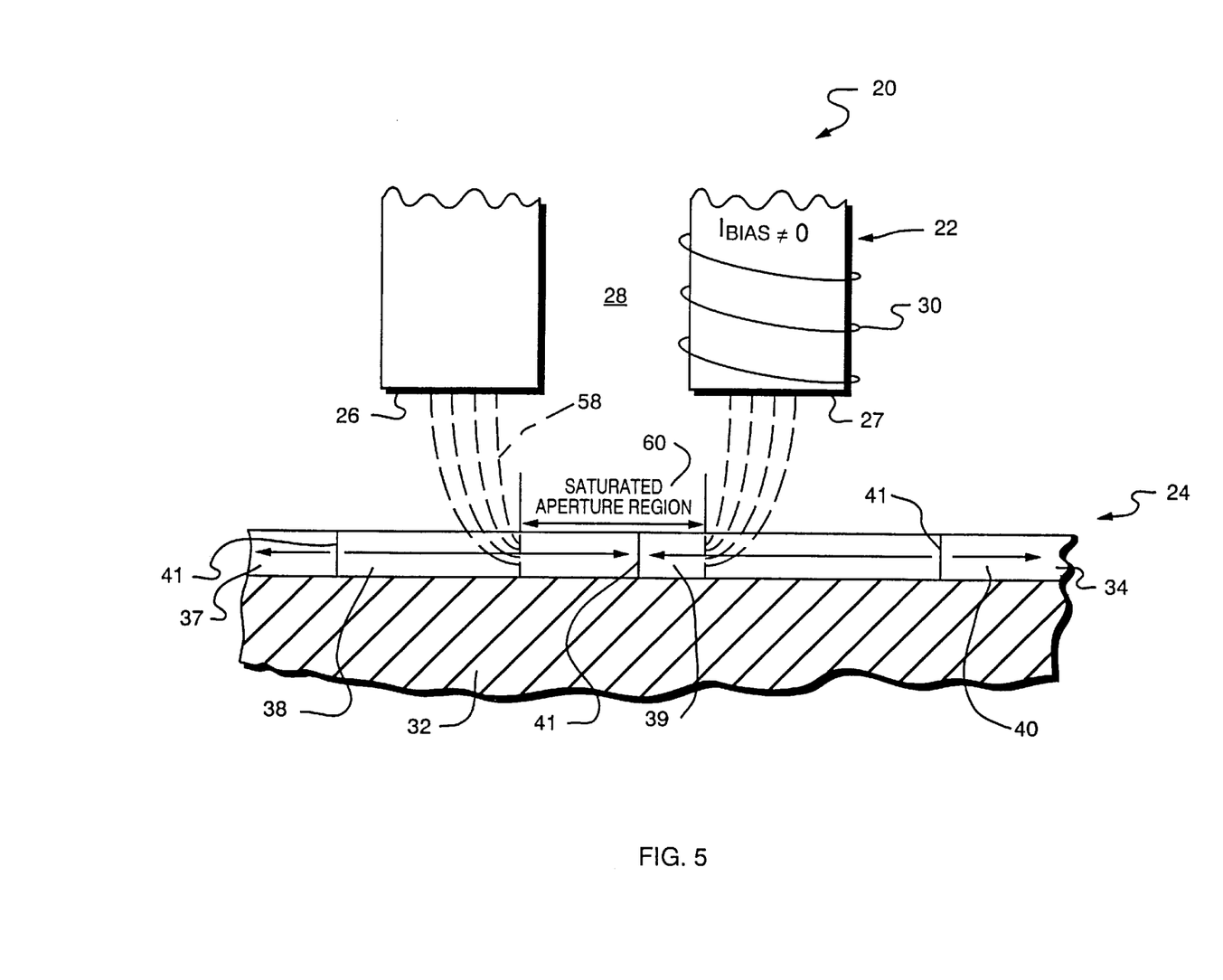
FIG. 5 is a schematic cross sectional illustration of a keepered flexible, particulate magnetic tape storage medium and a portion of a transducer having a non-zero bias current applied to a transducer pole winding which saturates a portion of the keeper to form an aperture region.

Referring to FIG. 5, during reproduction operations, a DC bias current is applied to the winding 30 to create a bias flux 58 which permeates and saturates the soft magnetic material which encapsulates the hard magnetic particles in the magnetic storage layer 34 between the poles 26, 27, to establish a saturated aperture region 60. Since the aperture region 60 is saturated by the bias flux 58, the shunt path established through that portion of the keeper is substantially terminated. Significantly, as the flexible medium is moved past the head and a record transition 41 is passed "through" the saturated aperture region 60, flux from the record transition 41 fringes out of the aperture region 60 and induces a head output voltage indicative of the data represented by the record transition. The saturated aperture region 60 operates as an opening, through which flux from the magnetic storage layer 34 is allowed to pass because of the saturated nature of the region 60.

Figure 6:
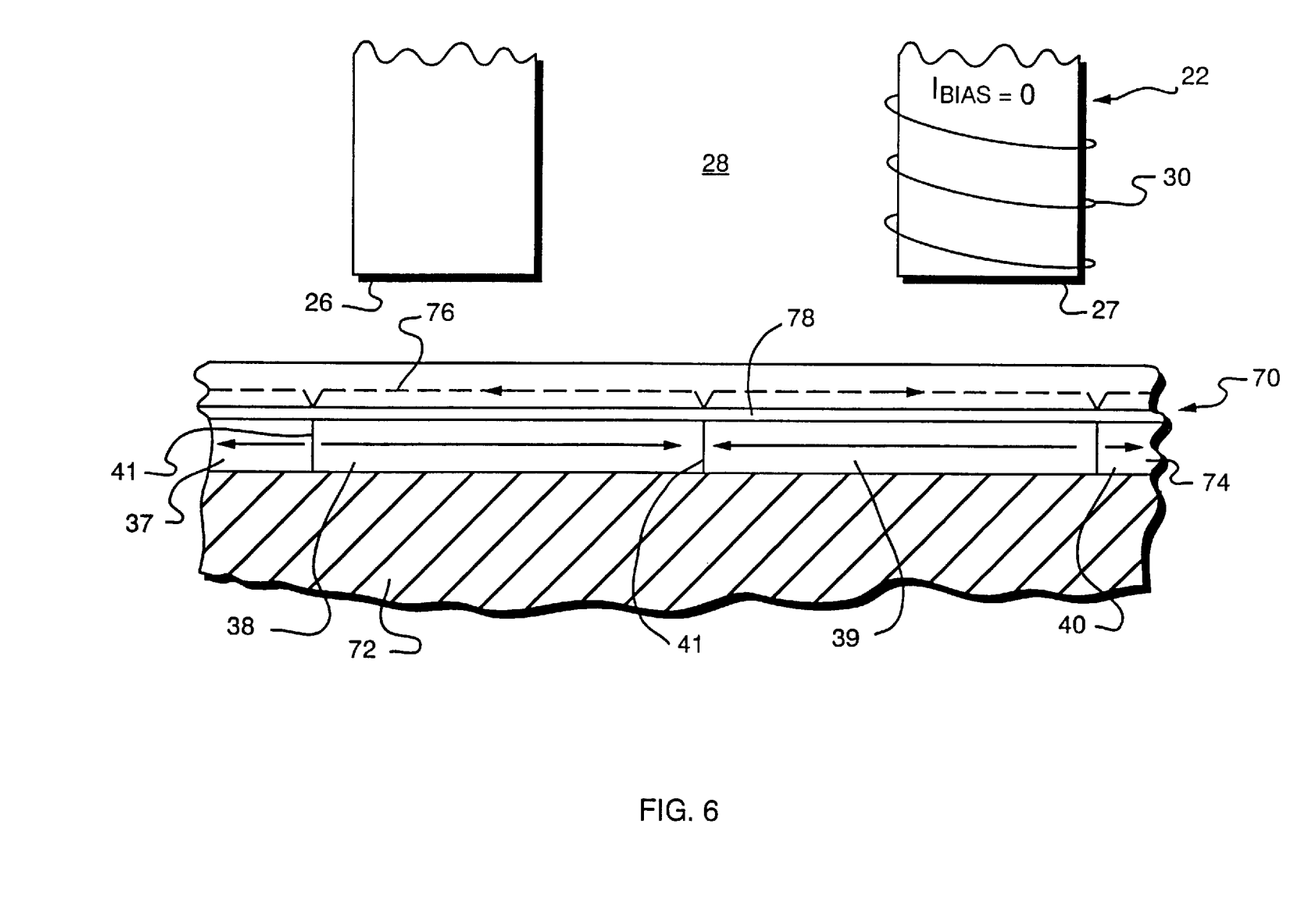
FIG. 6 is a schematic cross sectional illustration of an alternative embodiment flexible, particulate magnetic storage and reproducing system featuring a distinct particulate keeper layer.

The keeper layer may also be established as a distinct, thin layer of soft magnetic material that is synthesized in a particulate form, and applied over the surface of the conventional hard magnetic layer before the combined layers are dried and calendered. It should be noted that such a keeper layer may be positioned either above or below the hard magnetic layer. Referring to FIG. 6, an alternative embodiment magnetic storage medium 70 includes a plastic substrate 72 such as polyethylene terephthalate (PET) over which is coated a mixture of hard magnetic particles embedded in a binder of cross linkable resins to establish a hard magnetic layer 74. Other ingredients such as plasticizers, lubricants, head cleaning agents etc. may be added to the layer as known in the art. The hard magnetic particles may be iron, coated with a protective ceramic coating or iron oxide doped with cobalt. According to another aspect of the invention, overlaying this protective ceramic coating is a distinct keeper layer 76 of soft magnetic material that is applied in a manner such that the keeper layer is in intimate magnetic contact with the hard magnetic layer 74, yet physically separated from it by a thin break layer 78.

Figure 7:
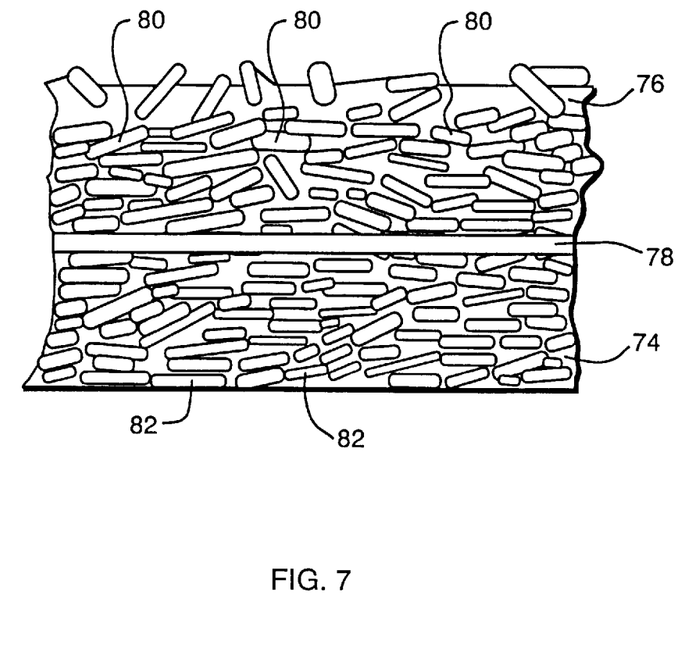
FIG. 7 is a cross sectional illustration of a portion of the flexible, particulate magnetic storage medium illustrated in FIG. 6.

Referring to FIG. 7, the distinct keeper layer 76 is comprised of a plurality of soft magnetic particles 80 that have a coercivity of less than about 20 Oe in the frequency range of interest, and a permeability which is greater than about two (2) where the permeability of air is defined as one. The size of each particle 80 is such that the average does not differ greatly from the average size of particles 82 within the hard magnetic layer 74 (i.e., within one order of magnitude on either side of the mean). In addition, the saturation magnetic moment $(m_s)$ of the keeper layer 76 is comparable to the remnant moment $(m_r)$ of the hard layer 74. Further, the keeper layer 76 should not be commingled with the hard layer 74, and therefore the break layer 78 is at least about 5 Angstroms thick.

Figure 8:
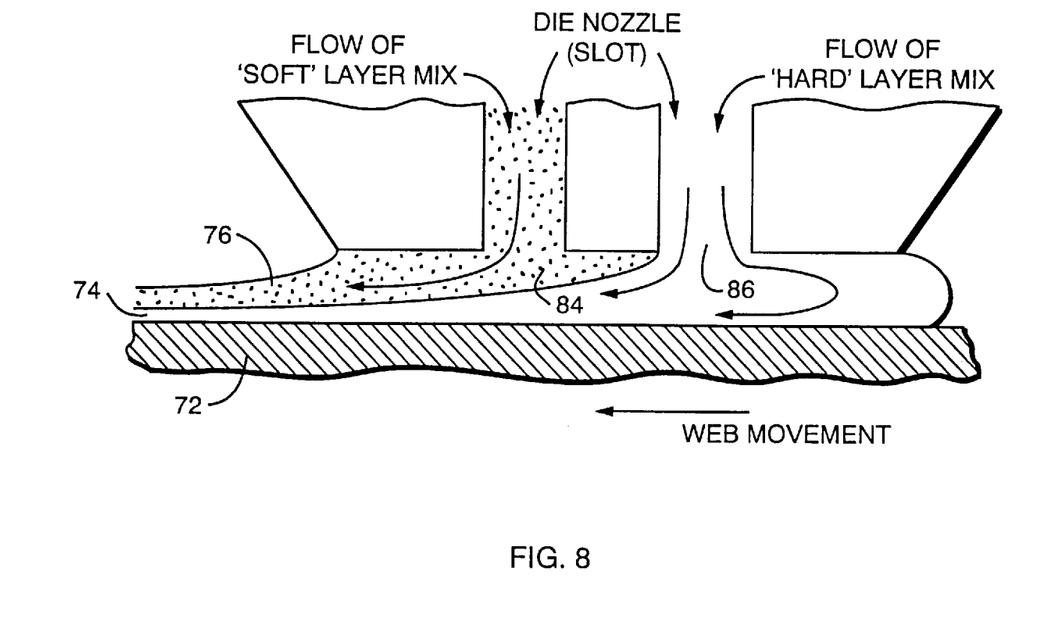
FIG. 8 is a schematic illustration of the slot die coating technique used to fabricate the magnetic storage medium illustrated in FIG. 6.

FIG. 8 is a schematic illustration of a multislot aperture die slot coating technique used to fabricate the flexible particulate magnetic storage medium illustrated in FIG. 6. As shown, the hard magnetic layer and the keeper layer are simultaneously applied to the substrate 72 by extrusion through two small slot apertures 84, 86 that are in contact with the moving flexible web. By control of the rheology and flow properties of the two mixes and selection of the appropriate aperture sizes 84, 86 and the relative pressures, the keeper layer 76 is overlaid onto the hard magnetic layer 74, and not commingled. Such a coated web can be slit or punched into tape or flexible disc format as desired. The break or decouple layer 78 can be provided by adding a third aperture or slot to the die shown in FIG. 8. Layer 78 would be extruded between hard layer 74 and keeper layer 76. Alternatively, as shown in FIG. 8, this decoupling layer may occur 'naturally' through the formation of a "resin rich" surface at the upper surface of the hard layer 74. A "resin rich" surface is shown in FIG. 2 in the top region of the magnetic storage layer 34.

Figure 9:
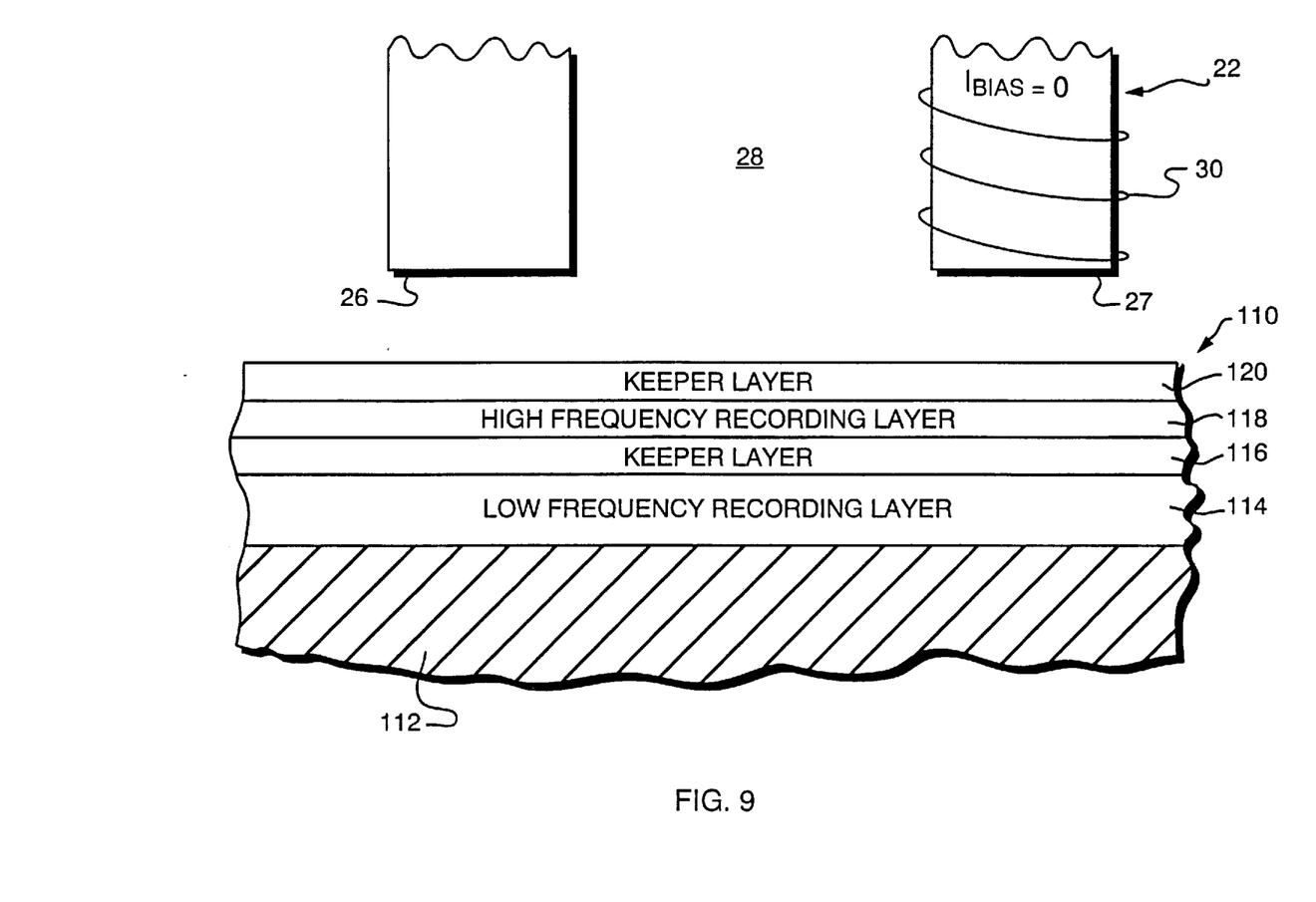
FIG. 9 is a schematic cross sectional illustration of another alternative embodiment flexible, particulate magnetic storage medium.
Figure 10:
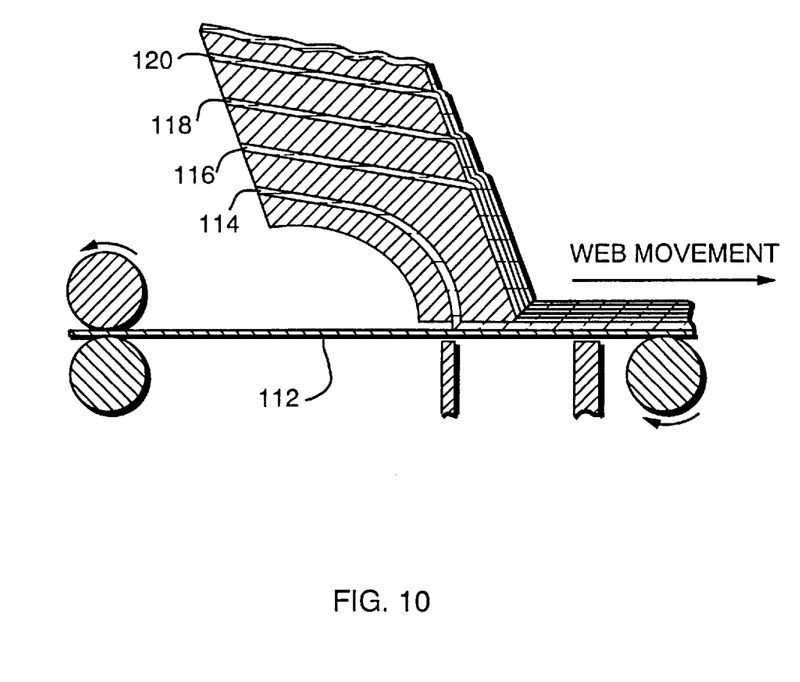
FIG. 10 is a schematic illustration of the slot die coating technique used to fabricate the alternative embodiment magnetic storage medium illustrated in FIG. 9.

FIG. 9 is a schematic cross sectional illustration of another alternative embodiment flexible, particulate magnetic storage medium 110 comprising several layers of alternating hard and soft materials. Specifically, the medium 110 includes a low frequency recording layer 114, a first keeper layer 116, a high frequency recording layer 118 and a second keeper layer 120. Such a structure is advantageous where both high and low frequency information is written to the storage medium 110. Significantly, the lower frequency information is recorded deeper into the storage medium 110 onto lower coercivity particles of the low frequency recording layer 114. The high frequency information would be recorded onto smaller, higher coercivity hard magnetic particles within the high frequency recording layer. Each of the keeper layers includes a plurality of soft magnetic particles (not shown) of relatively low permeability held within a resin binder. As set forth above, break layer is preferably provided between the record layer and the keeper layer (not shown). FIG. 10 is a schematic illustration of a multislot aperture die slot coating technique used to fabricate the flexible, particulate magnetic storage medium illustrated in FIG. 9.

It is contemplated that other layers may be used, including inert non-magnetic layers that are positioned to provide physical integrity to the entire multilayer combination.

Although the present invention has been shown and described with respect to preferred embodiments thereof, it should be understood by those skilled in the art that various other changes, omissions and additions to the form and detail thereof may be made therein without departing from the spirit and scope of the invention.

What is claimed is:

1. A flexible, particulate magnetic recording medium, comprising:
 a substrate; and
 a magnetic storage layer disposed on said substrate for storing magnetic signals, including magnetic particles held within a binder, wherein a plurality of said magnetic particles are each coated with a layer of soft magnetic material.

2. The flexible, particulate magnetic recording medium of claim 1, wherein said soft magnetic material has a DC permeability of less than about 1000 when said soft magnetic material is unsaturated.

3. The flexible, particulate magnetic recording medium of claim 2 further comprising:
 a second magnetic storage layer proximate to said magnetic storage layer, for storing low frequency information, and including magnetic particles held within a binder, wherein a plurality of said magnetic particles of said second magnetic storage layer are each coated with soft magnetic material.

4. The flexible, particulate magnetic recording medium of claim 3 wherein said coating of soft magnetic material around said storage magnetic particles in said first and second magnetic storage layers establishes a keeper layer around each of said magnetic storage particles wherein the permeability of each keeper layer is greater than about two (2).

5. A flexible, particulate magnetic recording medium, comprising:
 a non-magnetic substrate;
 a magnetic storage layer, including hard magnetic particles having high magnetic coercivity for storing information therein as magnetic states, and held within a binder; and
 a layer of magnetic material in intimate magnetic contact with said magnetic storage layer, and including soft magnetic particles having a low magnetic permeability and a low magnetic coercivity and whose thickness relative to that of said magnetic storage layer is such that the density of magnetic flux required to saturate said soft magnetic particles is less than the density of magnetic flux required to alter the magnetic states of said hard magnetic particles in said magnetic storage layer.

6. The flexible, particulate magnetic recording medium of claim 5 further comprising a non-magnetic break layer located between said magnetic storage layer and said layer of magnetic material.

7. The flexible, particulate magnetic recording medium of claim 6, wherein said magnetic storage layer is located over said substrate.

8. The flexible, particulate magnetic recording medium of claim 6 wherein said layer of soft magnetic material is located over said substrate.

9. The flexible, particulate magnetic recording medium of claim 6, wherein said soft magnetic particles have a coercivity on the order of 20 Oersteds.

10. The flexible, particulate magnetic recording of medium of claim 6, wherein said layer of magnetic material has a permeability greater than about two (2).

11. The flexible, particulate magnetic recording medium of claim 6, further comprising:
 a second magnetic storage layer including hard magnetic particles for storing information therein as magnetic states, wherein said hard magnetic particles are held within a binder; and
 a second layer of magnetic material, in magnetic relationship with said second magnetic storage layer, wherein said second layer of magnetic material comprises soft magnetic particles and whose thickness relative to said second magnetic storage layer is such that the density of magnetic flux required to saturate said soft magnetic particles of said second layer of magnetic material is less than the density of magnetic flux required to alter the magnetic state of said hard magnetic particles in said second magnetic storage layer.

12. A method of forming a flexible particulate recording medium, comprising the step of:
 providing a substrate;
 depositing a magnetic storage layer onto said substrate, wherein said magnetic storage layer includes hard magnetic particles held within a binder, and a plurality of said magnetic particles are coated with a layer of soft magnetic material.

13. The method of claim 12, wherein said step of depositing includes depositing said magnetic storage layer by die extrusion.

14. The method of claim 13, wherein said hard magnetic particles include fine iron particles.

* * * * *